(12) United States Patent
Pathak et al.

(10) Patent No.: US 11,061,793 B2
(45) Date of Patent: *Jul. 13, 2021

(54) GRAPHICALLY PROVIDING OLED DISPLAY POWER MODELING

(71) Applicant: Apple Inc., Cupertino, CA (US)

(72) Inventors: Abhinav Pathak, Campbell, CA (US); Conor J. O'Reilly, San Jose, CA (US); Shashi K. Dua, Los Gatos, CA (US); Udaykumar R. Raval, Cupertino, CA (US); Christopher W. Chaney, Saratoga, CA (US); Amit K. Vyas, San Jose, CA (US); Albert S. Liu, Sunnyvale, CA (US); Roberto Alvarez, San Francisco, CA (US); Rohit Mundra, Cupertino, CA (US); Vladislav Sahnovich, San Jose, CA (US); Patrick Y. Law, Cupertino, CA (US); Paul M. Thompson, San Jose, CA (US); Paolo Sacchetto, Cupertino, CA (US); Chaohao Wang, Sunnyvale, CA (US); Arthur L. Spence, San Jose, CA (US); Jean-Pierre Simon Guillou, Los Gatos, CA (US); Mohammad Ali Jangda, Cupertino, CA (US); Christopher Edward Glazowski, Los Gatos, CA (US); Yifan Zhang, San Carlos, CA (US); Prajakta S. Karandikar, Santa Clara, CA (US); Han Ming Ong, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 572 days.

This patent is subject to a terminal disclaimer.

(21) Appl. No.: 15/900,740

(22) Filed: Feb. 20, 2018

(65) Prior Publication Data
US 2018/0349244 A1   Dec. 6, 2018

Related U.S. Application Data

(60) Provisional application No. 62/513,387, filed on May 31, 2017.

(51) Int. Cl.
*G06F 11/30* (2006.01)
*H04L 29/08* (2006.01)
(Continued)

(52) U.S. Cl.
CPC ...... *G06F 11/3062* (2013.01); *G06F 11/3013* (2013.01); *G06F 11/328* (2013.01);
(Continued)

(58) Field of Classification Search
CPC ............ G06F 11/3062; G06F 11/3013; G06F 11/328; G06F 11/3447; G09G 3/32; H04L 67/34; H04W 4/60
See application file for complete search history.

(56) References Cited

U.S. PATENT DOCUMENTS 9,213,518 B2   12/2015   Yamashita
9,424,781 B2   8/2016   Park
(Continued)

OTHER PUBLICATIONS

Dong, M., et al., "Power Modeling of Graphical User Interfaces on OLED Displays," DAC '09 Proceedings of the 46th Annual Design Automation Conference, San Francisco, California, Jul. 26-31, 2009, pp. 652-657.

*Primary Examiner* — Chuen-Meei Gan
(74) *Attorney, Agent, or Firm* — Kilpatrick Townsend & Stockton, LLP

(57) ABSTRACT

Circuits, methods, and apparatus that may estimate the power being consumed by an OLED display screen of an
(Continued)

electronic device, may provide further information about that power usage, may modify or change functions performed by the electronic device based on that power usage, and may inform an application's developer about the amount of power being used by the electronic device while the electronic device is running the application. One example may estimate the power being used by an OLED display screen of an electronic device by determining the content of images being displayed during a duration. The estimated power may then be presented to a user. The estimated power may be used in decisions to modify or change parameters of the screen or other device components.

18 Claims, 17 Drawing Sheets

(51) Int. Cl.
*G09G 3/32* (2016.01)
*G06F 11/34* (2006.01)
*G06F 11/32* (2006.01)
*H04W 52/02* (2009.01)
*H04W 4/60* (2018.01)

(52) U.S. Cl.
CPC .......... *G06F 11/3447* (2013.01); *G09G 3/32* (2013.01); *H04L 67/34* (2013.01); *G09G 2320/0295* (2013.01); *G09G 2330/00* (2013.01); *G09G 2330/021* (2013.01); *G09G 2340/0435* (2013.01); *G09G 2360/16* (2013.01); *G09G 2370/04* (2013.01); *H04W 4/60* (2018.02); *H04W 52/0267* (2013.01)

(56) References Cited

U.S. PATENT DOCUMENTS

| | | | |
|---|---|---|---|
| 9,734,748 | B2 | 8/2017 | Chen |
| 10,559,251 | B2 | 2/2020 | Pathak et al. |
| 2003/0018258 | A1 | 1/2003 | Suzuki |
| 2003/0156074 | A1 | 8/2003 | Ranganathan |
| 2005/0237319 | A1* | 10/2005 | Ranganathan ........ G06F 1/3215 345/214 |
| 2005/0248515 | A1 | 11/2005 | Naugler, Jr. |
| 2006/0170822 | A1 | 8/2006 | Baba |
| 2006/0202630 | A1 | 9/2006 | Yamada |
| 2007/0279372 | A1 | 12/2007 | Brown Elliott |
| 2008/0180385 | A1 | 7/2008 | Yoshida |
| 2008/0297448 | A1* | 12/2008 | Mizukoshi ........... G09G 3/3208 345/76 |
| 2009/0327784 | A1* | 12/2009 | Shah ..................... H04L 67/125 713/340 |
| 2010/0225673 | A1 | 9/2010 | Miller |
| 2011/0181500 | A1 | 7/2011 | Liao |
| 2012/0019506 | A1* | 1/2012 | Hekstra ................ G09G 3/3233 345/212 |
| 2012/0169777 | A1 | 7/2012 | Budni |
| 2014/0240305 | A1 | 8/2014 | Chae |
| 2015/0052372 | A1* | 2/2015 | Barde ................... G06F 1/3228 713/300 |
| 2015/0170560 | A1* | 6/2015 | Lim ..................... G09G 3/3291 345/691 |
| 2016/0035293 | A1* | 2/2016 | Furihata ................. G09G 5/02 345/694 |
| 2016/0196198 | A1* | 7/2016 | Ajith Kumar ........ G06F 11/328 714/45 |
| 2018/0018316 | A1* | 1/2018 | Bogdan ................ G06F 16/285 |

* cited by examiner

GRAPHICALLY PROVIDING OLED DISPLAY POWER MODELING

CROSS-REFERENCES TO RELATED APPLICATIONS

This application claims the benefit of U.S. provisional patent application No. 62/513,387, filed May 31, 3017, which is incorporated by reference.

BACKGROUND

Battery-powered electronic devices have become a ubiquitous staple of life. Electronic devices, such as smart phones, tablets, laptops, flashlights, keyboards, mice, headphones, and other portable devices are used on a regular basis, and as a result, their batteries need to be charged regularly. Because of this, electronic devices often provide users with information regarding the state of charge and information regarding the rate of discharge of a battery.

Display screens are one of the components that draw a large amount of power from batteries in electronic devices. Accordingly, it may be desirable to provide accurate power usage estimations for these screens. But such estimations have proven to be difficult to compute. For example, organic light-emitting diode (OLED) display screens are made up of an array of pixels, each pixel including red, green, and blue subpixels. Each of the different colored subpixels may have a different efficiency and may require a different amount of energy to provide a given luminance. As a result, the power consumed by an OLED display screen may vary depending on the content of an image that is being displayed. This may make it difficult to provide accurate information to a user about the battery drain associated with various apps used.

Along with these screens, electronic devices may include circuitry that may provide various functions. As a battery discharges to low levels, it may be useful to modify or change some of these functions to lengthen a battery life in an electronic device in order to increase an amount of time between recharging.

Also, since the power consumed by an OLED display screen is content dependent, it may be useful to inform an application's developer about the amount of power being used by an electronic device running the application. This may allow the developer to make power saving changes to the application.

Thus, what is needed are circuits, methods, and apparatus that may estimate the power being consumed by a screen of an electronic device, may provide further information about that power usage, may modify or change functions performed by the electronic devices based on that power usage, and may inform an application's developer about the amount of power being used by the electronic device while the electronic device is running the application.

SUMMARY

Accordingly, embodiments of the present invention may provide circuits, methods, and apparatus that may estimate the power being consumed by a screen of an electronic device, may provide further information about that power usage, may modify or change functions performed by the electronic devices based on that power usage, and may inform an application's developer about the amount of power being used by the electronic device while the electronic device is running the application.

An illustrative embodiment of the present invention may estimate the power being used by a screen of an electronic device by determining the content of images being displayed during a number of frames. These and other embodiments of the present invention may determine the content being displayed by counting color values for each subpixel of the pixels of the screen. Each color value for each color of subpixel for the screen may be counted, for example using a number of counters or other circuits arranged to generate a histogram for each color. An average of the color values for each color (an average of the color components) may be calculated using the histograms. For example, for each color, each count in a histogram may be multiplied by a value of its bin in the histogram. The products of the count and bin values may be added and divided by the total number of counts in the bins (which is equal to the number of pixels of the screen) to generate an average of the color values for a frame. This may be done for each color to generate three averages for each frame. The averages may be accumulated over a number of frames. That is a running total of the averages may be accumulated over time. To give context to the running total, a duration value, such as a frame count or frame rate indicating a number of frames for which the averages have been accumulated, may be tracked. These four values, the accumulated averages for the color values of each color and the frame count, may be read at two different times separated by a first duration. The differences in the averages may be divided by the frame count to determine an average color content of the images displayed during the first duration. From these four values, a rate of power dissipation of the screen for the first duration may be estimated. Other factors, such as screen brightness, may also be included in the power estimation.

These and other embodiments of the present invention may provide graphics processors, or other integrated circuits or integrated circuit chipsets that include histogram circuits, which may be counters, calculating circuits, adders, and registers. The integrated circuit chipset may be electronic components including one or more integrated circuits. The registers may be accessible by a power computation module in a central processing unit by using an interface on the graphics processor. The graphics processors may be integrated circuits that further include geometry shaders, pixel shaders, graphics pipelines, and other appropriate circuits.

The power computation module may read accumulated color value averages and frame counts from the registers of the graphics processor and use this information to estimate the power being used by the screen. The power computation module may read the accumulated color value averages and multiply each by an efficiency coefficient. These efficiency coefficients may be scaled based on the proportional amount of power used by each color of subpixels of the screen. The products of the efficiency coefficients and the color value averages may be summed together. The result may be a value that is proportional to the power consumed by the screen.

These and other illustrative embodiments of the present invention may inform a user about the amount of power being used in various ways. For example, an extrapolation of the present rate of power consumption may be used to determine how long the battery, at its present level of charge, may provide power before requiring a charge. This information may be presented on the screen to a user as a time before charge, or as an absolute time at which a charge will be needed.

In these and other embodiments of the present invention, screen power usage may be estimated for a context, where a context may be an application, a program, a particular screen view in an application, among others. The battery usage information may be provided for each of a number of contexts that a user has accessed. For example, an amount of time that the battery may be able to run a first application may be presented to the user. In these and other embodiments of the present invention, a time at which a charge would be needed if the first application continues to run may be presented to the user.

These and other illustrative embodiments of the present invention may modify or change functions performed by an electronic device based on these power estimations. For example, a screen refresh rate or brightness or luminance may be lowered in response to a determination that an expected battery life is short. Other functions performed by the electronic device may be similarly curtailed, limited, or otherwise modified.

These and other illustrative embodiments of the present invention may inform an application's developer about an amount of power being used by the electronic device while the electronic device is running the application. For example, an application may run on a first or target electronic device. A second electronic device may receive accumulated color value averages and frame counts from the first electronic device. The second electronic device may receive this information in increments, such as 1 second intervals. A second screen on the second electronic device may then provide the power usage of the first screen of the first electronic device for each increment to the developer. The developer may then adjust screen images shown by the application on the screen of the first device in order to reduce power consumption.

Embodiments of the present invention may provide circuits, methods, and apparatus to estimate power usage of screens in various types of devices, such as portable computing devices, tablet computers, desktop computers, laptops, all-in-one computers, wearable computing devices, cell phones, smart phones, media phones, storage devices, portable media players, navigation systems, monitors, power supplies, video delivery systems, adapters, remote control devices, chargers, and other devices.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
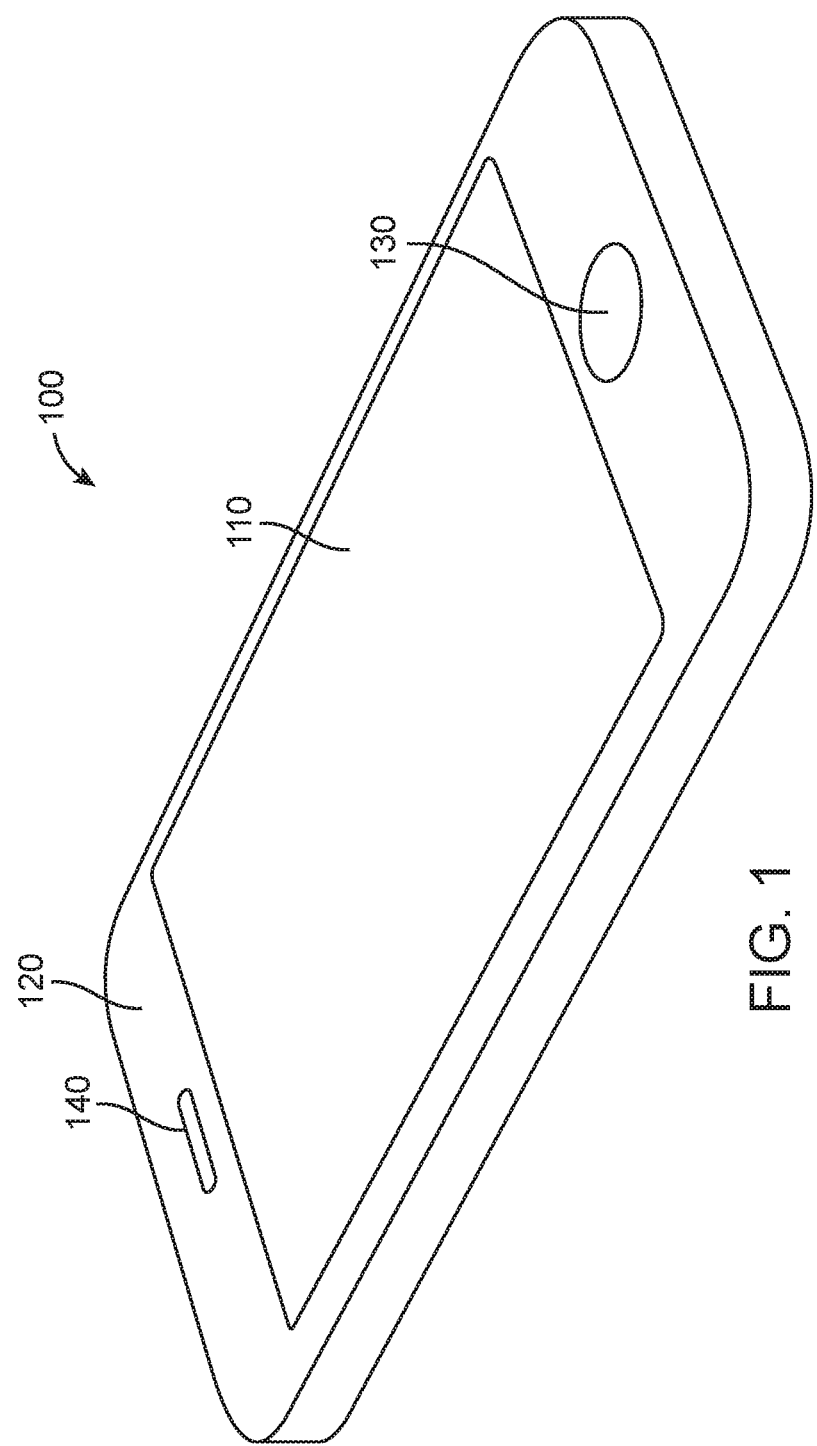
FIG. 1 illustrates an electronic device that may be improved by the incorporation of embodiments of the present invention.

FIG. 1 illustrates an electronic device that may be improved by the incorporation of an embodiment of the present invention. This figure, as with the other included figures, is shown for illustrative purposes and does not limit either the possible embodiments of the present invention or the claims.

This figure illustrates electronic device 100. Electronic device 100 may include a housing 120 supporting a screen 110, one or more control buttons 130, and input and output devices, such as output device or speaker 140. In this example, electronic device 100 may be a smart phone, though other embodiments may be incorporated in other electronic devices such as portable computing devices, tablet computers, desktop computers, laptops, all-in-one computers, wearable computing devices, storage devices, portable media players, navigation systems, monitors, power supplies, video delivery systems, adapters, remote control devices, chargers, and other devices.

Electronic device 100 may further include an internal battery (not shown.) This internal battery may be charged inductively or through a connector (not shown.) The battery may provide power for components of the electronic device 100, such as the screen 110.

Screen 110 may be used by applications running on electronic device 100 to provide information to a user. Screen 110 may also be used to provide other information, such as information regarding a state of charge of the battery. For example, a graphic indicator showing a percentage of remaining battery capacitor may be provided to a user on screen 110.

It may be useful to provide further information about the battery to a user. For example, it may be useful to provide an indication as to how much time may be expected to pass (for example, two hours) before the battery is likely to need a recharge. It may also be useful to provide an absolute time (for example, 4 PM) at which the battery will likely need a recharge. These both can be done by determining a present rate of power usage and extrapolating that rate into the future.

But such estimations have proven to be difficult to compute. For example, organic light-emitting diode display screens are made up of an array of pixels, each pixel including red, green, and blue subpixels. Each of the different colored subpixels may have a different efficiency and may require a different amount of energy to provide a given luminance. As a result, the power consumed by an OLED display screen may vary depending on the content of the image that is being displayed. This may make it difficult to provide information to a user about the state of charge and rate of discharge of a battery that is powering a screen. Accordingly, embodiments of the present invention may provide circuits, methods, and apparatus that may estimate the power being consumed by a screen of an electronic device.

These circuits, methods, and apparatus may be configured in various ways. For example, the necessary computations may be divided into two main portions. A first portion may occur at a very high pixel clock rate where individual color values for every subpixel of a screen are counted. From these counts, an average color value (an average of the color components) may be calculated. These color value averages may be accumulated over a number of frames to generate accumulated color value averages. This portion may be performed by hardware or a hardware driver that may perform a fixed function. This hardware may be a portion of an integrated circuit, such as a graphics processor. The hardware may be a portion of an integrated circuit chipset that may be electronic components including one or more integrated circuits, one of which may be a graphics processor or perform graphics processing functions. A second portion of the calculations may occur at a slower frame rate speed. In this second portion, the accumulated color value averages, along with a duration value such as a frame count or frame rate, may be read and used to estimate power usage. This portion may be done in software, for example by a module in a driver running on a central processing unit. This software may be more flexible and may be able to operate on the data from the hardware or hardware driver in various ways. In these and other embodiments of the present invention, either of these functions may be implemented in hardware, by a hardware driver, in software, or combination thereof. Examples of this are shown in the following figures.

Figure 2:
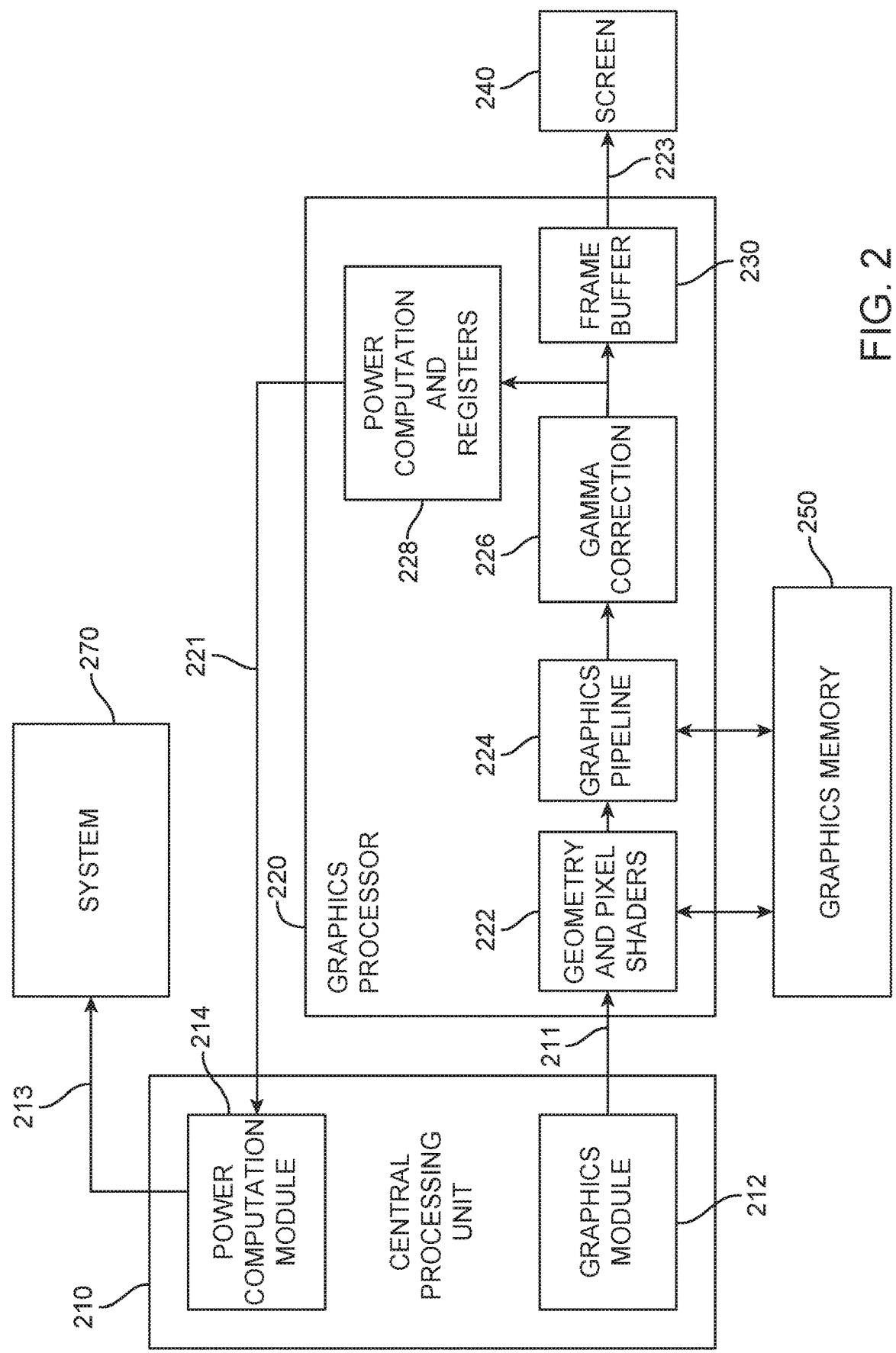
FIG. 2 is a block diagram of a portion of an electronic device according to embodiments of the present invention.

FIG. 2 is a block diagram of a portion of an electronic device according to embodiments of the present invention. The block diagram shown may be a block diagram for the electronic device 100 shown in FIG. 1, or it may be a block diagram for other electronic devices consistent with embodiments of the present invention.

This electronic system may include a central processing unit 210. Central processing unit 210 may include drivers running one or more software modules, such as graphics module 212. Graphics module 212 may provide vertices and state information on lines 211 to graphics processor 220. Lines 211 may be part of a Peripheral Component Interconnect Express (PCIe) or other interface. Graphics processor 220 may be an integrated circuit or combination of integrated circuits, such as an integrated circuit chipset. The vertices and state information from graphics module 212 may be received by geometry and pixel shaders 222. The geometry and pixel shaders 222 may generate color values for subpixels to be displayed in a graphics image. Graphics pipeline 224 may provide further processing, such as modifications to the color values provided by geometry and pixel shaders 222. For example, graphics pipeline 224, by itself or along with other circuitry, may generate visual effects such as gamma correction, time of day modifications (for example, reducing blue color components at night), and the like. Geometry and pixel shaders 222 and graphics pipeline 224 may store and retrieve data from graphics memory 250. Graphics pipeline 224 may generate color values to be displayed by the subpixels of screen 240. More specifically, these color values may be generated in linear space, and may be gamma corrected before being provided to a screen. For example, gamma correction circuit 226 may gamma correct the linear color values provided by graphics pipeline 224. Gamma correction circuit 226 may provide the gamma corrected color values on lines 223 to frame buffer 230. Frame buffer 230 may typically be one or more memories for storing the gamma corrected color values, and may provide them to subpixels of screen 240.

The color values provided by gamma correction circuit 226 to the frame buffer 230 may be received by power computation and registers 228. That is, color values may be provided by gamma correction circuit 226 directly to the power computation and registers 228, the color values may be provided by gamma correction circuit 226 to frame buffer 230, which may then provide the color values to power computation and registers 228, or some other routing may be used. The power computation circuitry in power computation and registers 228 may generate an accumulated average for the color values provided to subpixels of a screen for a number of frames. A duration value, such as a frame count or frame rate, may also be generated, where the duration value or frame count indicates a number of frames for which the averages were accumulated. The accumulated color value averages and frame count may be stored in registers in power computation and registers 228.

The accumulated color value averages and frame count may be accessed by power computation module 214 running on central processing unit 210. For example, central processing unit 210 may access registers in power computation and registers 228 via an interface circuit (not shown.) The accumulated color value averages and frame count may be provided on lines 221 to power computation module 214. Power computation module 214 may further process the accumulated color value averages and frame count. Power computation module 214 may receive other information, such as information relating to screen brightness, and use this information along with the accumulated color value averages and frame count to generate a power estimation. The power computation module 214 may then provide information based on the power estimation to a user, a developer, or it may alter functions and operation of screen 240 or system 270, or both, based on the power estimation.

Again, power computation and registers 228 may generate and store accumulated color value averages and frame counts. A flowchart illustrating this is shown in the following figure.

Figure 3:
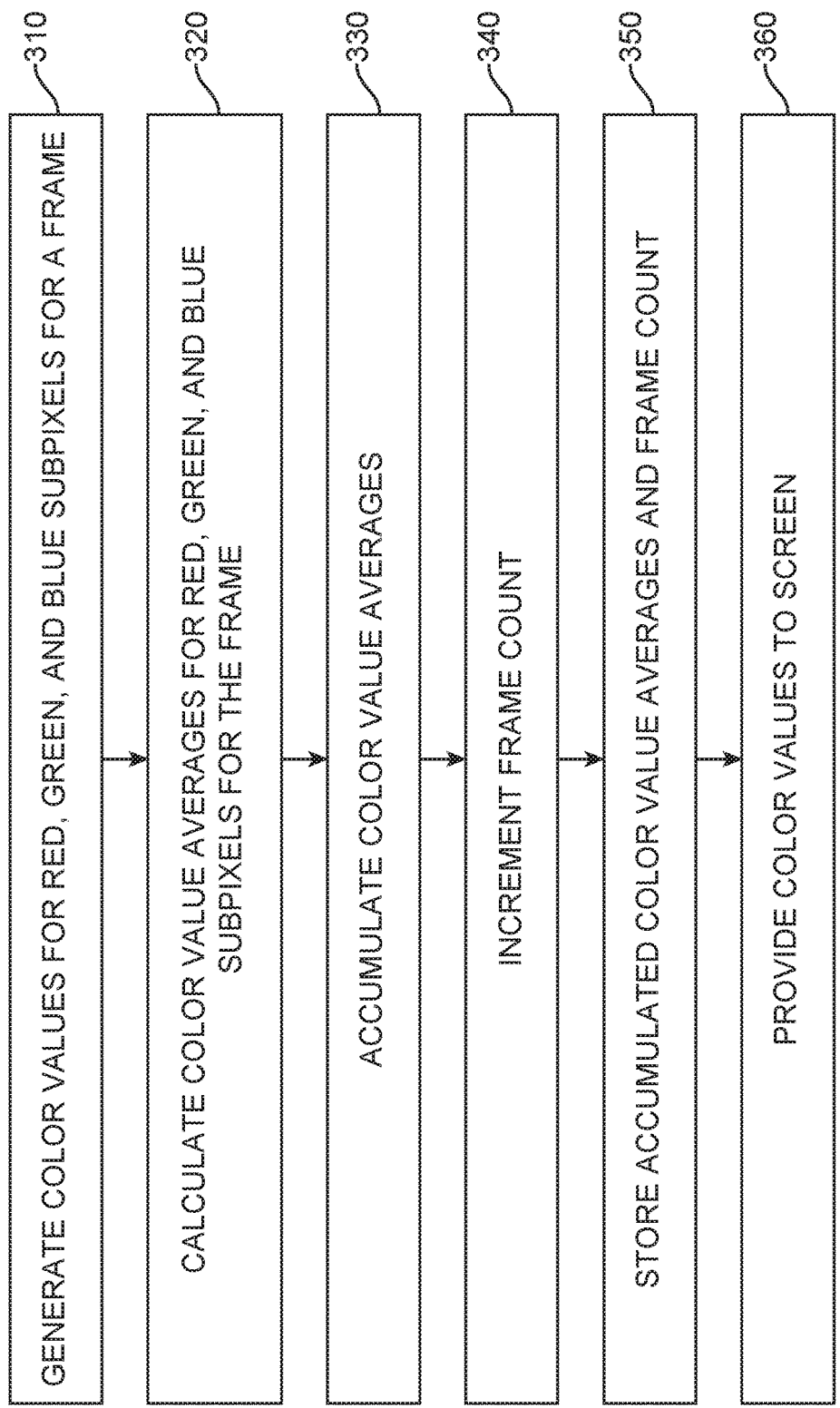
FIG. 3 is a flowchart illustrating a portion of the operation of a graphics processor according to an embodiment of the present invention.

FIG. 3 is a flowchart illustrating a portion of the operation of a graphics processor according to an embodiment of the present invention. In act 310, geometry and pixel shaders 222, graphics pipeline 224, and gamma correction circuit 226 may generate color values for red green and blue subpixels for a frame to be displayed on screen 240. Averages of the red, green, and blue subpixels for the frame may be calculated in act 320. Again, the clock rate for these circuits may be the pixel clock rate. Accordingly, these calculations may be performed in hardware or by a hardware driver. The averages may be accumulated (successively added to each other) in act 330. A frame count indicating how many frames have been accumulated may be incremented in act 340. The accumulated computed averages and frame count may be stored in registers in act 350. The color values may be provided to screen 240 in act 360.

These accumulated averages of the color values may be generated in various ways. For example, binning circuitry may be used to generate histograms, were the occurrence of some or all of the possible color value levels are counted for all the subpixels of a frame. For example, for an 8-bit screen, 256 color value levels are possible. A count indicating the occurrence of each of the 256 levels may be generated by the binning circuitry. This binning circuitry may employ counters or other circuitry. These counts may be multiplied by a value for each bin, and the resulting products may be accumulated. The accumulated values may be divided by the total number of subpixels in a frame, or the total number of counts in all the bins, to generate an average. The averages may be accumulated or summed together over a number of frames to generate an accumulated weighed average. Examples are shown in the following figures.

Figure 4:
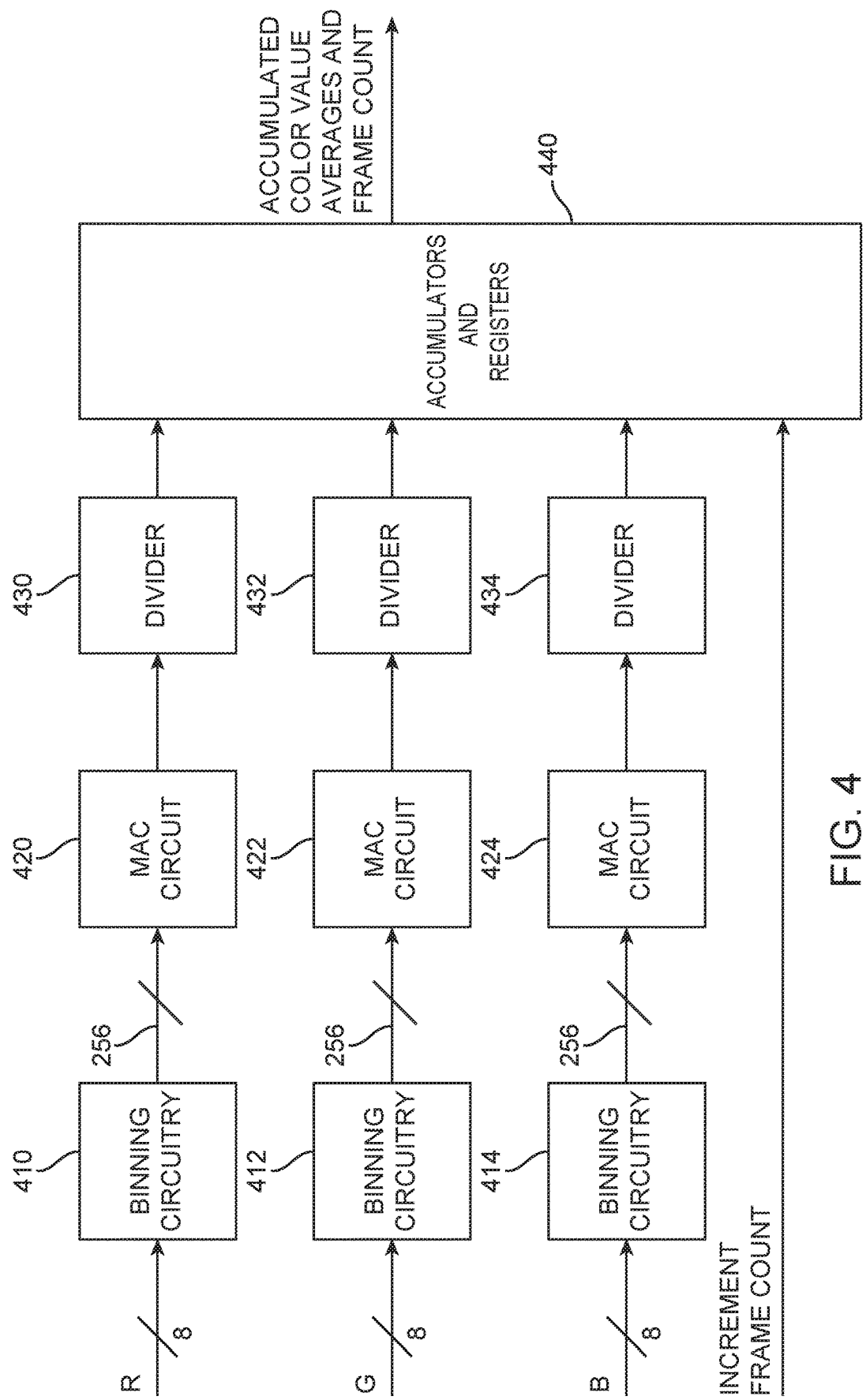
FIG. 4 illustrates circuitry that may be employed by power computation and registers circuitry in a graphics processor according to an embodiment of the present invention.

FIG. 4 illustrates circuitry that may be employed by power computation and registers 228 in graphics processor 220 as shown in FIG. 2. This circuitry may include binning circuitry 410, 412, and 414 for receiving red, green, and blue color values. The binning circuitry 410, 412, and 414 may each provide histograms having 256 entries or binds, where each bin stores a number of occurrences or counts for a particular color value level for the subpixels in a frame. MAC (multiply and accumulate) circuits 420, 422, and 424 may multiply the bin occurrences or counts by bin values, and then may sum the resulting products. The summed values may be divided by the number of subpixels of that color in a frame (which may be the same as the total number of occurrences or counts in all the bins) to generate an average. This may be done for each color to generate an average for the color values of each color for the frame (an average of the color components). These color value averages may then be accumulated and stored in registers 440. An increment frame count signal may be received and may increment a frame counter in registers 440.

The exact implementation of this circuitry may vary in different embodiments of the present invention. In one embodiment of the present invention, binning circuitry 410, 412, and 414 may include 256 bins having values from 0 to 255. The number of occurrences or counts in each bin may be multiplied by the value from 0 to 255 and the 256 resulting products may be added together in MAC circuits 420, 422, and 424. The resulting sum may be divided by the number of total occurrences or counts in the bins, which may be the same as the total number of pixels, in dividers 430, 432, and 434. The averages may then have a value between 0 and 255. The binning circuitry 410, 412, and 414 may be reset each frame, and the averages may be accumulated and stored in accumulators and registers 440. The frame count may be incremented by one each frame and the frame count may be stored in accumulators and registers 440.

Figure 5:
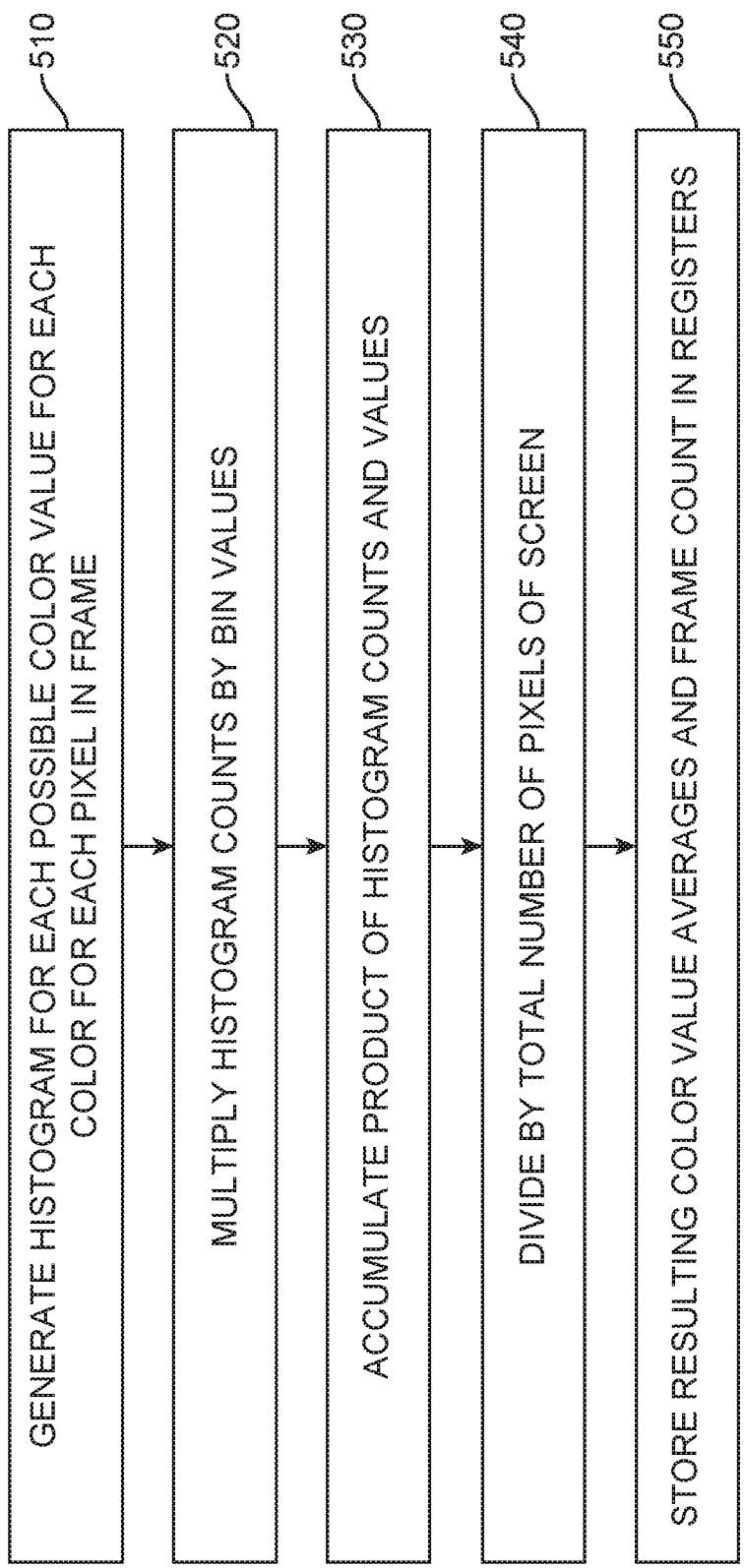
FIG. 5 is a flowchart illustrating the operation of the circuitry in FIG. 4.

FIG. 5 is a flowchart illustrating the operation of the circuitry in FIG. 4. In act 510, histograms for each possible color value for each color of the pixels in a frame may be generated. The histogram counts may be multiplied by bin values in act 520. These products may be accumulated, or added together, in act 530. The summed value may be divided by total number of pixels in the screen in act 540. In act 550, the resulting averages may be accumulated and stored along with a frame count in registers. The frame count may indicate a number of frames for which the color value averages have been accumulated.

Once the accumulated color value averages and frame counts are calculated and stored, they may be retrieved by power computation module 214, as shown in FIG. 2. Power computation module 214 may be a module of a driver running on central processing unit 210. The accumulated color value averages and frame counts may be used, along with other information, such as screen brightness, to generate an estimated rate of power dissipation by the screen. An example is shown in the following figure.

Figure 6:
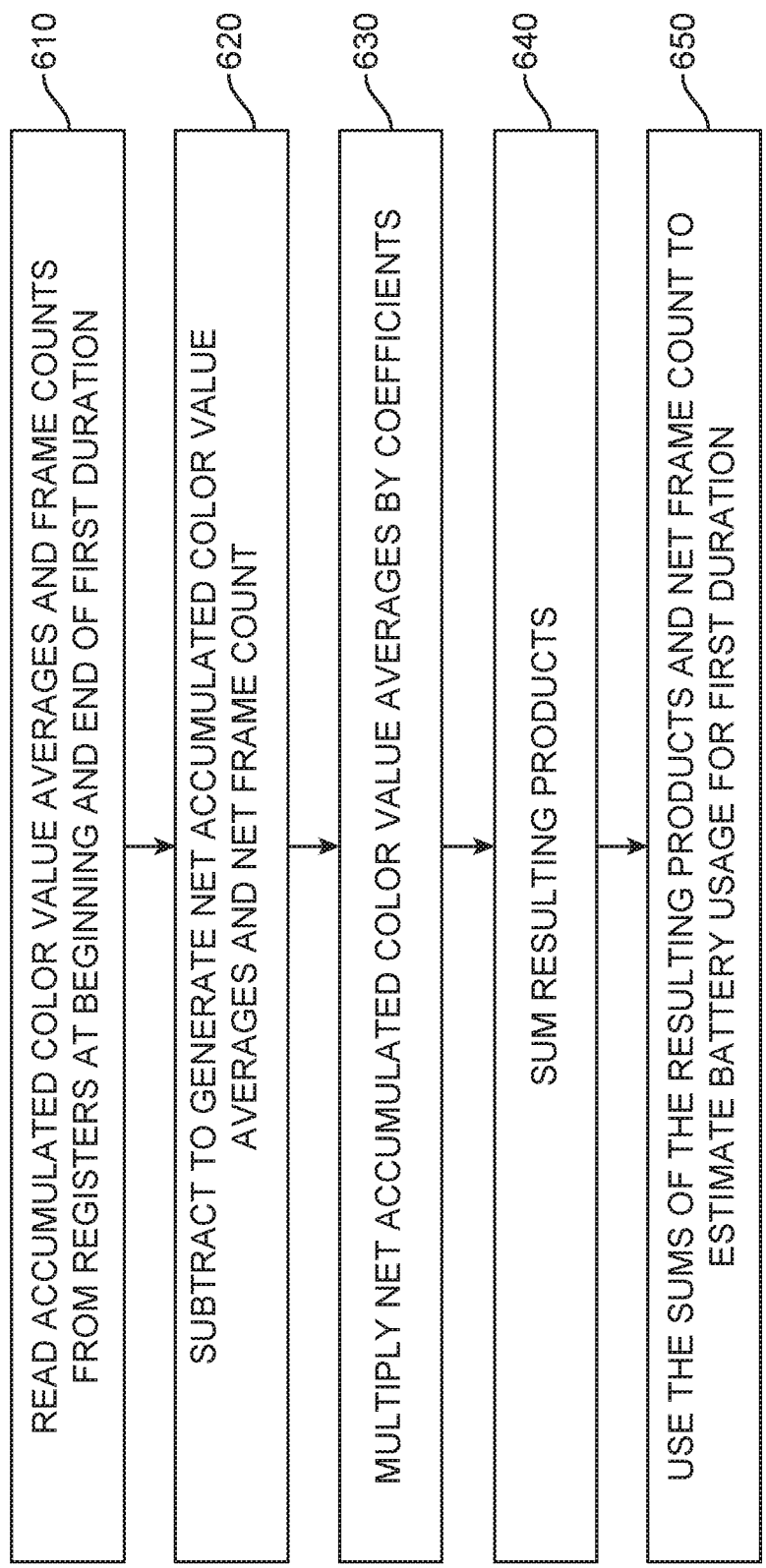
FIG. 6 is a flowchart illustrating the operation of a power computation module according to an embodiment of the present invention.

FIG. 6 is a flowchart illustrating the operation of a power computation module according to an embodiment of the present invention. In act 610, accumulated color value averages and frame counts may be read from registers at the beginning and end of a first duration. Differences in accumulated color value averages from the start to the end of the first duration may be calculated in act 620. The net accumulated color value averages may be multiplied by efficiency coefficients in act 630. These coefficients may reflect the efficiency for which each color of subpixel converts power into luminance. For example, blue pixels may be less efficient at converting energy into luminance and may need to be driven with more power. Accordingly, the coefficient used to multiply the blue color value average might be higher than for the red and the green net accumulated color value averages. In a specific embodiment of the present invention, the coefficients for the red, green, and blue colors may be 0.20, 0.25, and 0.55, respectively, though other coefficients, such as 0.25, 0.20, and 0.55, respectively, may be used in these and other embodiments of the present invention. The resulting products may be summed in act 640. The resulting sum, along with a duration value such as a frame count, may be used to estimate battery usage for the first duration in act 650.

In these examples, a value that is reflective of the power being consumed during a frame, a number of frames, or other duration may be estimated. As shown below, typically these values are accumulated over a number of frames. For illustration, where the duration is a single frame, the value may be referred to as an average pixel luminance, or APL. A combined APL for a number of frames may be generated in two steps. First, accumulated color value averages are computed in hardware or by a hardware driver, as outlined in FIG. 5. Second, the accumulated color value averages are scaled and added in software as shown in FIG. 6. An APL for a single frame may be summarized by the following equation:

$$APL = \frac{\sum_{i=1}^{row \times col} k_r \left(\frac{g_{r_i}}{g_{max}}\right)^{2.2} + k_g \left(\frac{g_{g_i}}{g_{max}}\right)^{2.2} + k_b \left(\frac{g_{b_i}}{g_{max}}\right)^{2.2}}{row \times col}$$

where $k_r$, $k_g$, and $k_b$ are the efficiency coefficients for each color of subpixel, $g_{r_i}$ is the gray scale value of red for each red subpixel of the screen, $g_{max}$ is the maximum possible gray scale value for each subpixel of the screen, row and col are the number of rows and columns of the screen, and the exponent 2.2 is present to convert gamma-corrected color values back to the linear space.

The equation can be described as follows: For each subpixel in a pixel, divide the color value by a maximum color value. Convert the gamma corrected value back to linear space, and multiply by an efficiency coefficient. Sum the results, then repeat for each pixel and then sum those results. Normalize by dividing by the number of pixels of the screen, thus yielding a value that is proportional to the power usage for that frame.

Using the actual equation above to estimate power usage would be somewhat unwieldy. Also, the power used by a single frame has limited interest, so embodiments of the present invention typically accumulate values over a number of frames. For example values may be accumulated, that is, successively added to a running total, for every frame following a power-on-reset or other such event. Accordingly, embodiments of the present invention may use the methods outlined in FIGS. 5 and 6. Specifically, in FIG. 5, binning circuits (shown in FIG. 4 as binning circuitry 410, 412, and 414) may be used to generate a count of each possible color value level that appears during a frame. The counts may then be multiplied by bin values and the products may be added, for example using MAC circuits 420, 422, and 424. An average may be found by dividing the sum of the products by the number of pixels of the screen (using dividers 430, 432, and 434), which is also the total number of counts for the frame. This average may be expressed by the equation:

$$\text{average} = \bar{r} = \frac{\sum_{i=1}^{2^N} count_i \times value_i}{\sum_{i=1}^{2^N} count_i},$$

where $count_i$ is the count for each bin, $value_i$ is the value of each bin, and N is the number of bits per color value. These averages may be accumulated over a number of frames. A frame count may track the number of frames for which the averages are accumulated. Again, this color value average may be computed in hardware or by a hardware driver, such as in power computation and registers 228 as shown in FIG. 2.

As shown in FIG. 6, net accumulated color value averages for a first duration may be multiplied by power efficiency coefficients and summed. For a single frame, this may be expressed by the equation:

$$APL = K_r \bar{r} + K_g \bar{g} + K_b \bar{b}$$

where $k_r$, $k_g$, and $k_b$ are the power efficiency coefficients and $\bar{r}$, $\bar{g}$, and $\bar{b}$ are color value averages for the frame. This function may be performed in software, for example by power computation module 214 running on central processing unit 210. Instead of generating an APL for each frame, the averages may be accumulated in hardware or by a hardware driver, and then net accumulated color value averages may be multiplied by the power efficiency coefficients $k_r$, $k_g$, and $k_b$ and combined. This, along with the frame count, may be used to estimate power usage by the screen. The estimated battery usage may then be used to generate information that may be provided to the user. For example, information regarding power consumption of a screen for a specific duration may be provided to a user. An example is shown in the following figure.

Figure 7:
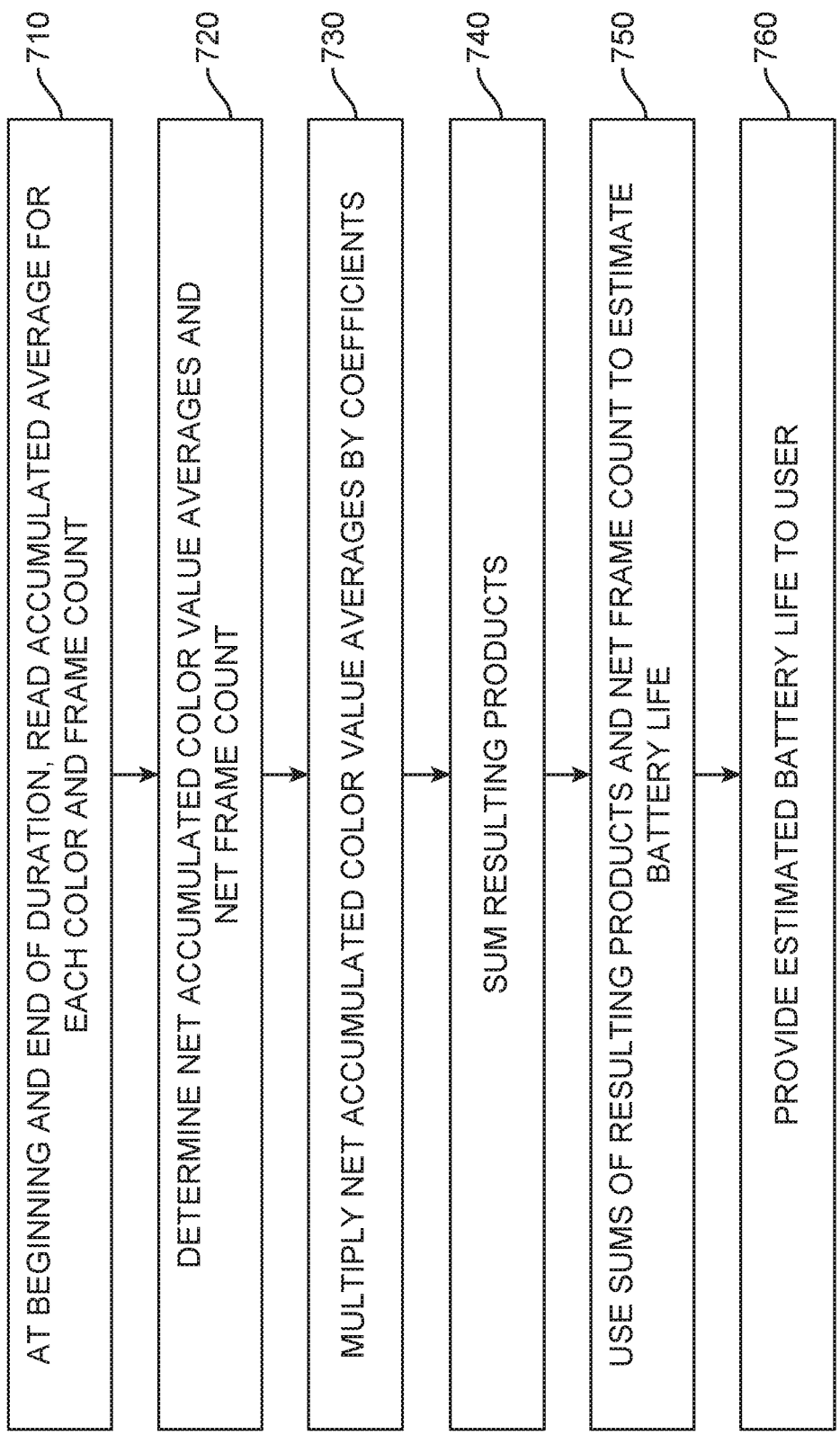
FIG. 7 is another flowchart illustrating the operation of a power computation module according to an embodiment of the present invention.

FIG. 7 is another flowchart illustrating the operation of a power computation module according to an embodiment of the present invention. In act 710, accumulated color value averages and frame counts may be read at the beginning and end of a first duration. A net accumulated average for each color, and a net frame count, may be found by subtraction in act 720. As before, the accumulated color value averages may be multiplied by efficiency coefficients in act 730. The resulting products may be summed in act 740. These sums of the resulting products, along with the net frame count, may be used to estimate a remaining battery life in act 750. This estimated battery life may be provided to a user in act 760. Again, the estimated battery life may be provided in terms of an absolute duration, as a specific end time, or in other ways in other embodiment of the present invention.

In various embodiments of the present invention, the duration for which these values are accumulated may vary. For example, they may begin and end with various events. These events may include a power on of the device or screen, the start or end of an application or portion of an application or other context, a user change in screen brightness, or the passage of a specific amount of time.

Instead of estimating battery usage for a specific duration, power computation module 214 may estimate battery usage for a specific context, where a context may be a program, application, interface within an application, or other appropriate program or application portion. For example, a first application may consume power at a first rate. This first rate may be estimated by power computation module 214 and provided to a user in order to show power usage by that application. This information may be provided to a user by using a graphical image on screen 110. An example is shown in the following figure.

Figure 8:
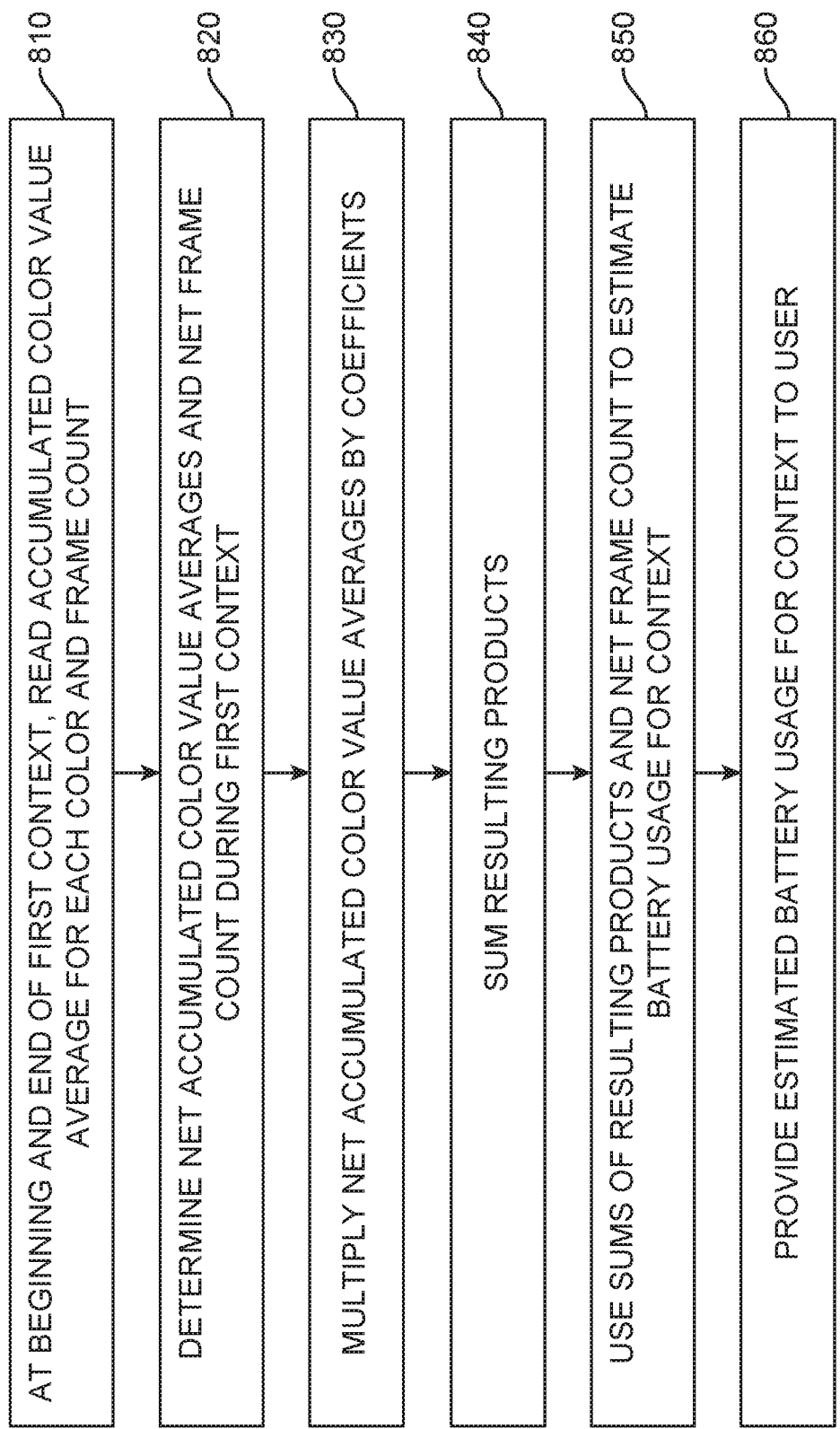
FIG. 8 is another flowchart illustrating the operation of a power computation module according to an embodiment of the present invention.

FIG. 8 is another flowchart illustrating the operation of a power computation module according to an embodiment of the present invention. In act 810, accumulated color value averages for each color and corresponding frame counts may be read from registers at the beginning and end of a context. In act 820, net averages for each color and a net frame count may be calculated for the first context. The net accumulated color value averages may be multiplied by efficiency coefficients in act 830. The resulting products may be summed in act 840 and the sum of the resulting products and net frame count may be used to estimate battery usage for the context. This estimation may be provided to a user in act 860.

Along with informing a user about the power dissipation, in these and other embodiments of the present invention, the power computation module may act to alter the function or operation of screen 110 or other circuit in electronic device 100. An example is shown in the following figure.

Figure 9:
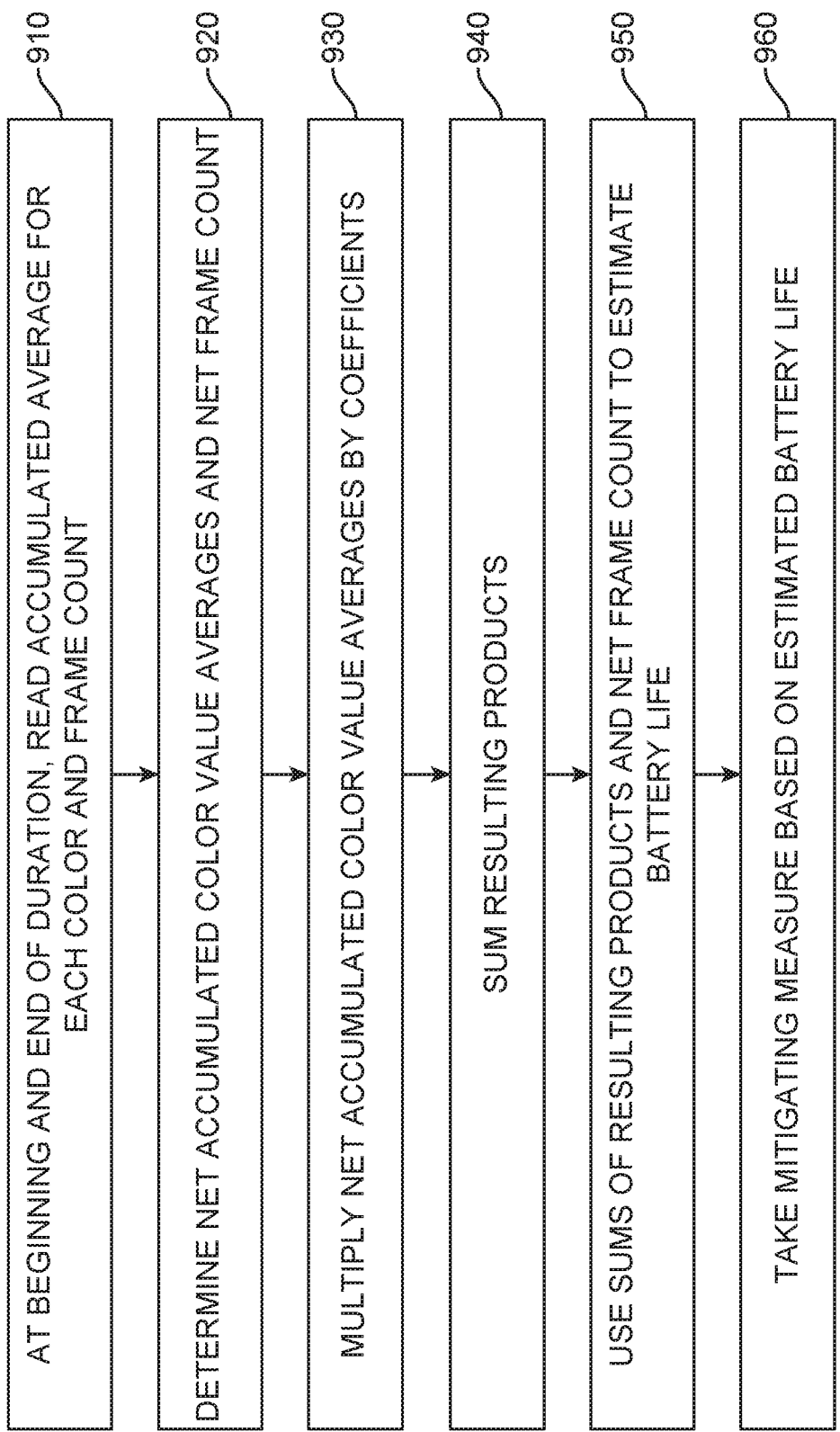
FIG. 9 is another flowchart illustrating the operation of a power computation module according to an embodiment of the present invention.

FIG. 9 is another flowchart illustrating the operation of a power computation module according to an embodiment of the present invention. In act 910, accumulated averages for each color and their corresponding frame counts may be read from registers at the beginning and end of a first duration. Net accumulated averages for each color and frame counts may be calculated by subtraction for a first duration in act 920. The net accumulated averages may be multiplied by efficiency coefficients in act 930, and the resulting products may be summed in act 940. Sums of the resulting products, along with the net frame count, may be used to estimate battery life in act 950. Based on this estimation, one or more mitigating measures may be taken in act 960.

Various mitigating measures may be taken in various embodiments of the present invention. For example, the luminance or brightness of the screen may be lowered to save power. Other circuitry may be turned off or partially disabled in order to save power. In various embodiments of the present invention, the power computation module may work with an application to change displayed images such that they use more power efficient colors including red and green, along with a corresponding reduction in the use of blue.

In these and other embodiments of the present invention, a refresh rate at which graphics data is provided to a screen may be throttled or reduced in order to save power. The way in which this may save power is shown in the following figures.

Figure 10:
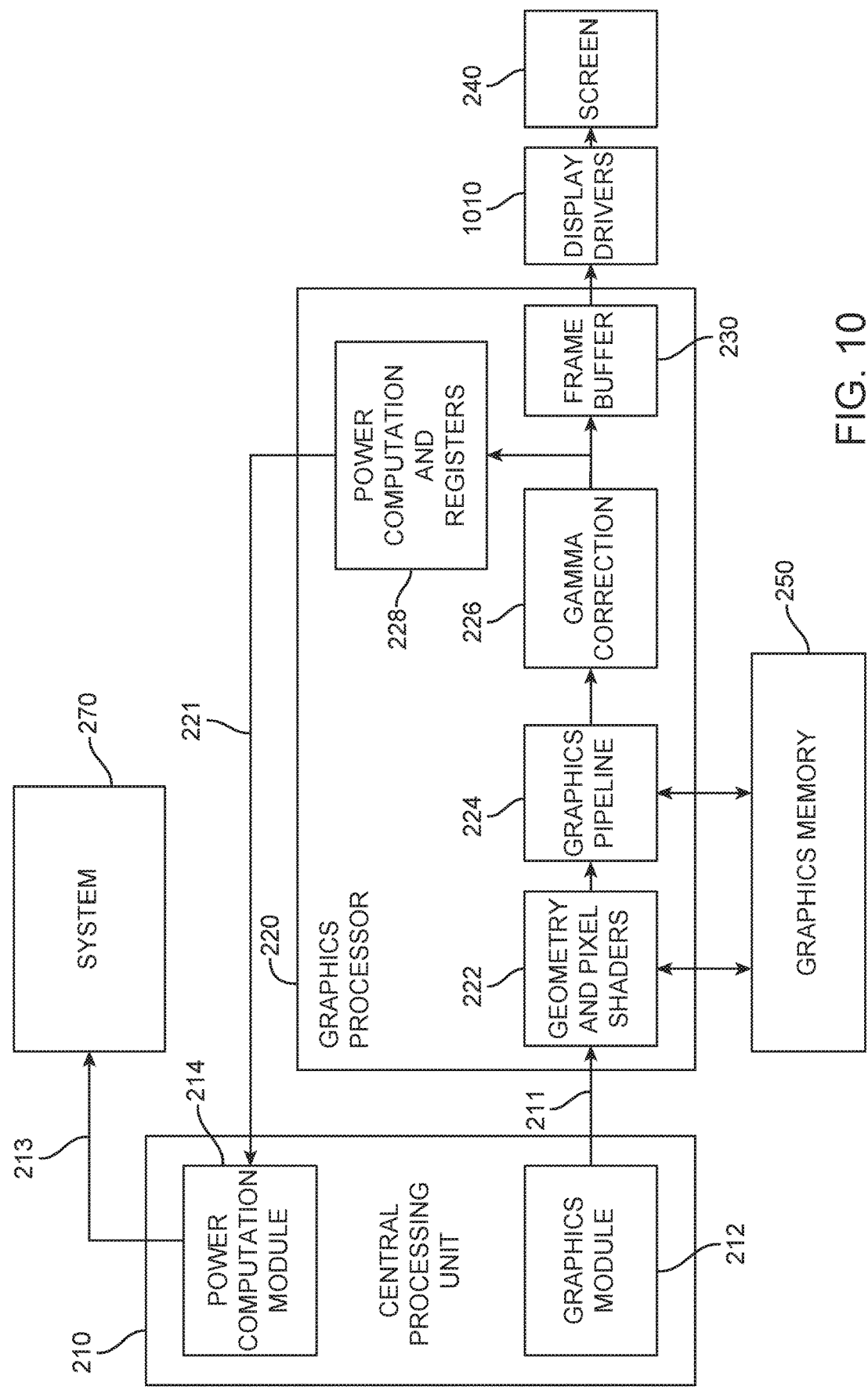
FIG. 10 illustrates another block diagram of an electronic device according to an embodiment of the present invention.

FIG. 10 illustrates another block diagram of an electronic device according to an embodiment of the present invention. This block diagram may operate the same or similar to the block diagram of FIG. 2. In this example, display drivers 1010 have been explicitly shown. Specifically, frame buffer 230 may provide gamma corrected color values to display drivers 1010. Display drivers 1010 may drive the subpixels of screen 240.

The power consumed by the subpixels of screen 240 may be independent of the refresh rate at which new color values are provided to screen 240. However display drivers 1010 may need to change state between frames, and these state changes may require power. That is, the faster the frames are refreshed, the more power may be dissipated by display drivers 1010. This is shown graphically in the following figure.

Figure 11:
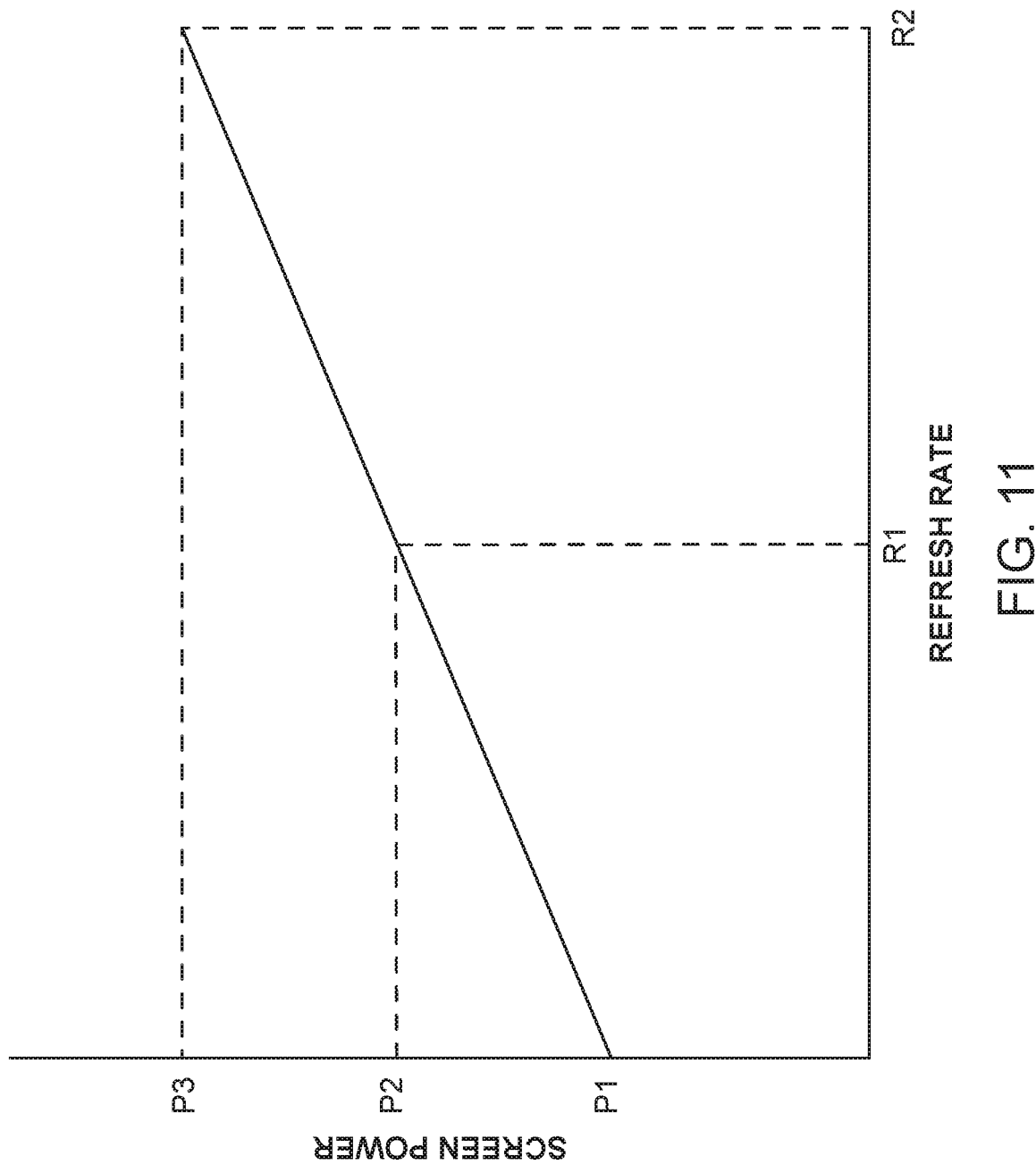
FIG. 11 illustrates a relationship between screen power and refresh rate according to an embodiment of the present invention.

FIG. 11 illustrates a relationship between screen power and refresh rate according to an embodiment of the present invention. In this example, the screen power may include the power of display drivers 1010 and the power provided to subpixels of screen 240. The power provided to the subpixels of screen 240 may be represented as P1. This is the power the may be dissipated by a screen that is not being refreshed. At a first refresh rate R1, an increase of power from P1 to P2 may be consumed by display drivers 1010. Similarly, at a higher refresh rate R2, a further increase in power, represented as the difference between P3 and P1, may be consumed by display drivers 1010.

As can be seen in this figure, reducing a refresh rate from a higher rate R2 to a lower rate R1 may save power, shown here as the difference between P2 and P1. Accordingly, in these and other embodiments of the present invention, the refresh rate of screen 240 may be reduced as directed by power computation module 214 in order to save power.

In these and other embodiments of the present invention, a screen's battery usage information may be tracked and provided to a third-party, such as an application developer. An application developer may use a second device to monitor a first device that is running an application under development. Screen battery usage and other information may be read from the first device and displayed on the second device. The developer may use this information in adjusting or modifying the application under development to be more power efficient. An example of such a development system is shown in the following figure.

Figure 12:
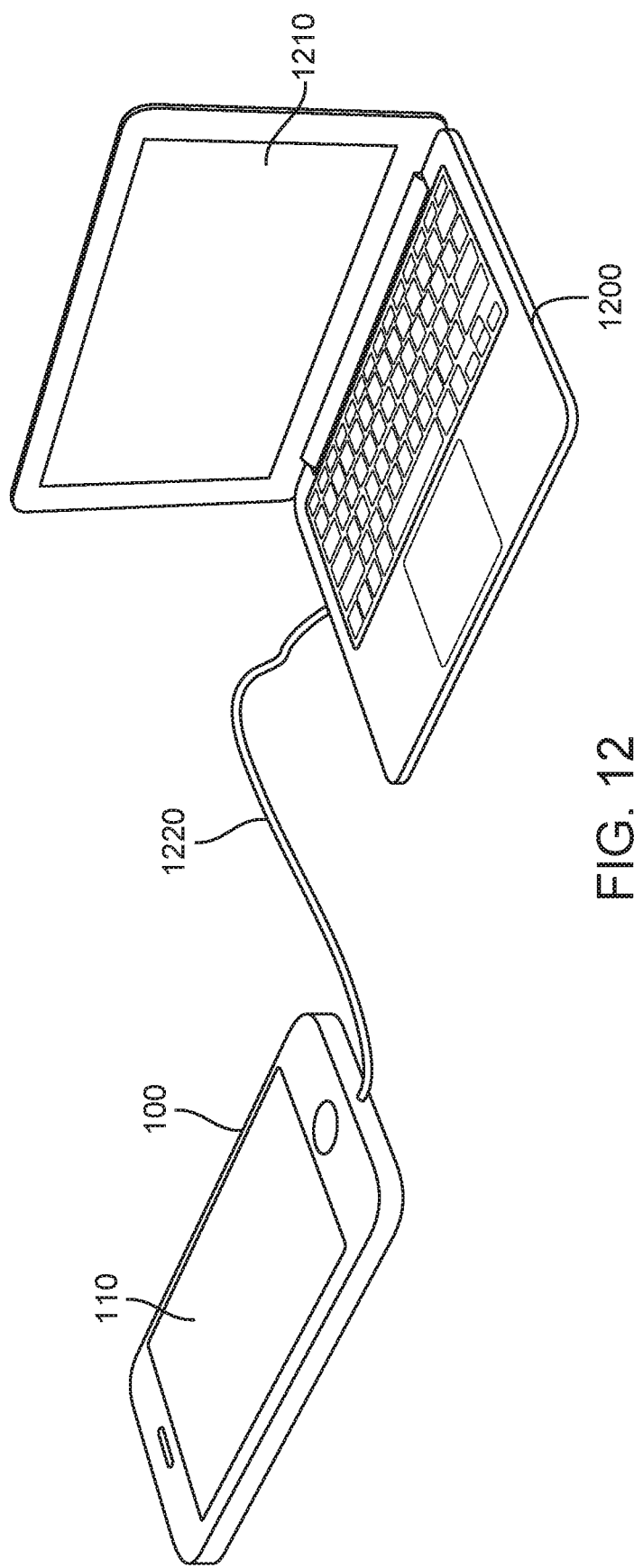
FIG. 12 illustrates a development system according to an embodiment of the present invention.

FIG. 12 illustrates a development system according to an embodiment of the present invention. A first or target device, such as first electronic device 100, may include a screen 110. First electronic device 100 may run an application under development. A second electronic device 1200 may include a screen 1210. Second electronic device 1200 may cause an application under development to be loaded onto first electronic device 100 over cable 1220. Second electronic device 1200 may then cause the application to run on first electronic device 100. Second electronic device 1200 may then retrieve information about the operation of the application from first electronic device 100 over cable 1220. For example, second electronic device 1200 may retrieve accumulated color value averages and frame counts from electronic device 100. The accumulated color value averages may be retrieved directly from registers in power computation and registers 228, or power information may be retrieved after processing has been performed by power computation module 214 on the averages. Other information regarding power dissipation by other circuits and components of first electronic device 100 may also be retrieved using second electronic device 1200. The power dissipation information may be processed and displayed in graphical form to a developer on screen 1210.

To reduce the amount of computation performed by first electronic device 100, second electronic device 1200 may read accumulated color value averages and frame counts from power computation and registers 228 and bypass the power computation module 214. An example is shown in the following figure.

Figure 13:
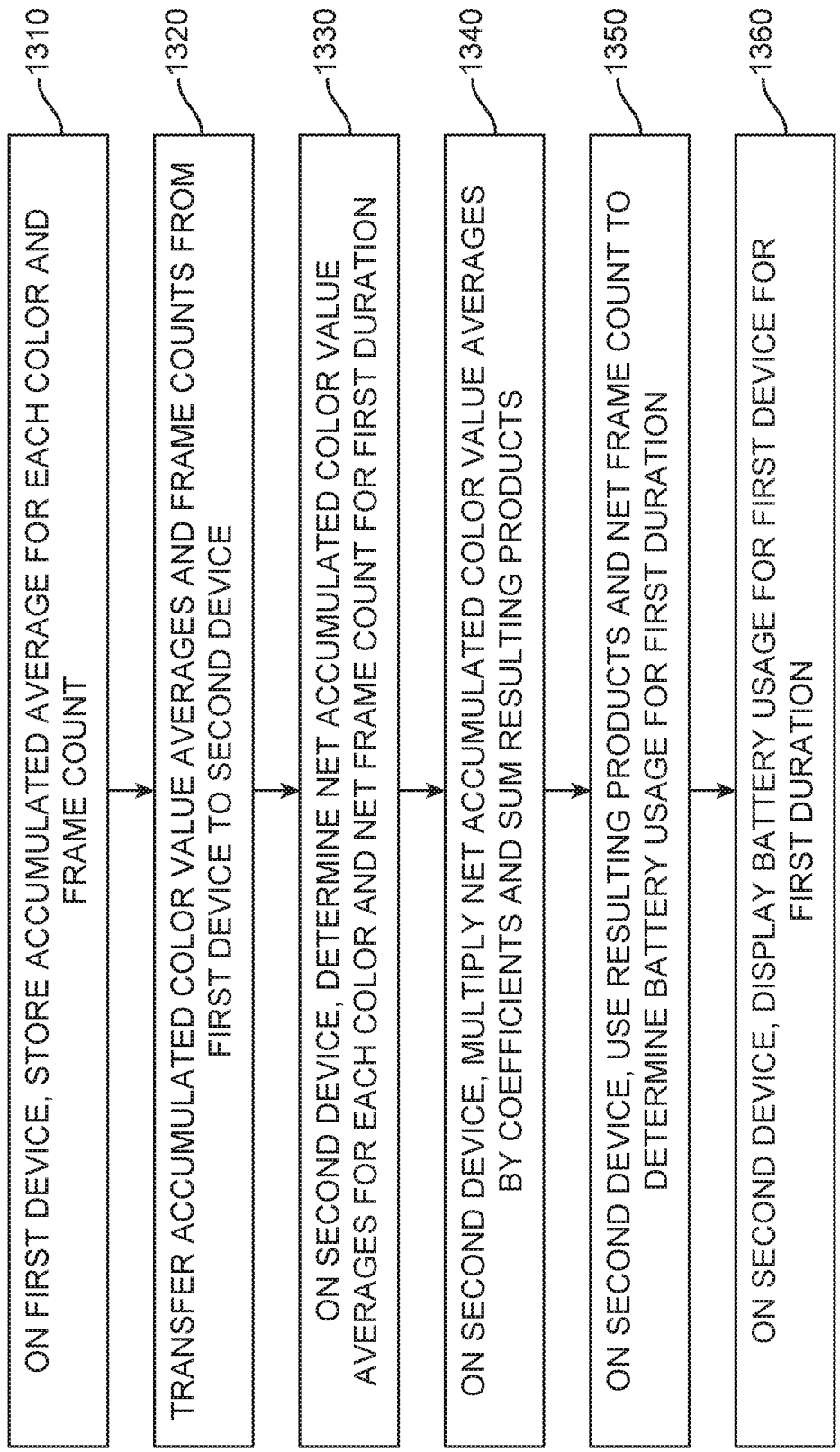
FIG. 13 illustrates a method of displaying battery usage information in a development system according to an embodiment of the present invention.

FIG. 13 illustrates a method of displaying battery usage information in a development system according to an embodiment of the present invention. In act 1310, on a first or target device, at the beginning and end of a first duration, accumulated color value averages for each color and a corresponding frame count may be stored. These accumulated color value averages and frame counts may be transferred from the first device to a second device in act 1320. More specifically, at the start of a duration, accumulated color value averages and a frame count may be transferred from the first device to a second device, and at the end of the duration, updated accumulated color value averages and an updated frame count may be transferred from the first device to a second device. In act 1330, the second device may determine net accumulated color value averages for each color and a net frame count for a first duration. The accumulated color value averages may be multiplied by coefficients and summed for the first duration, in act 1340. On the second device, the resulting products and frame counts may be used (along with screen brightness or other factors) to determine battery usage by the screen 110 for the first duration in act 1350. In act 1360, the battery usage for the first device for the duration may be displayed on the second device.

In these and other embodiments of the present invention, the workload outlined above may be distributed among the first device and the second device in various ways. That is, one or more of the software steps or acts 1330, 1340, and 1350, may be performed by the first device instead of the second device, as shown in FIG. 13. An example is shown in the following figure.

Figure 14:
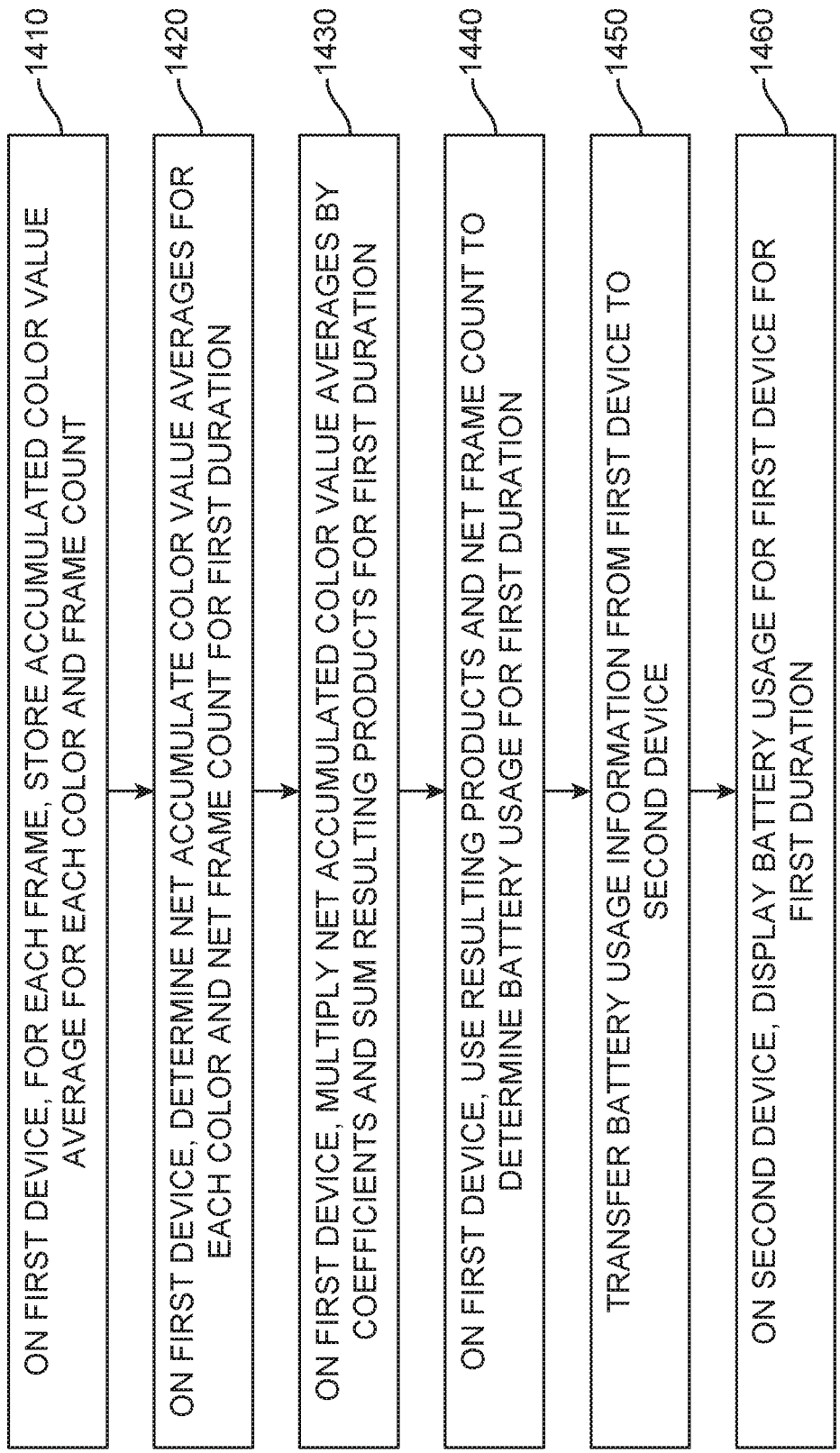
FIG. 14 illustrates another method of displaying battery usage information in a development system according to an embodiment of the present invention.

FIG. 14 illustrates another method of displaying battery usage information in a development system according to an embodiment of the present invention. In act 1410, on a first or target device, at the beginning and end of a first duration, accumulated averages for each color component and corresponding frame counts may be stored. On the first device, net accumulated color value averages and a net frame count may be determined for the first duration in act 1420. In act 1430, the net accumulated color value averages may be multiplied by coefficients and summed in act 1430. On the first device, the resulting products and net frame count may be used to determine battery usage by the screen 110 for the first duration in act 1440. The battery usage information may be transferred from the first device to the second device in act 1450. In act 1460, the second device may be used to display battery usage information for the first device during the first duration.

Examples of how this power information may be displayed are shown in the following figures.

Figure 15:
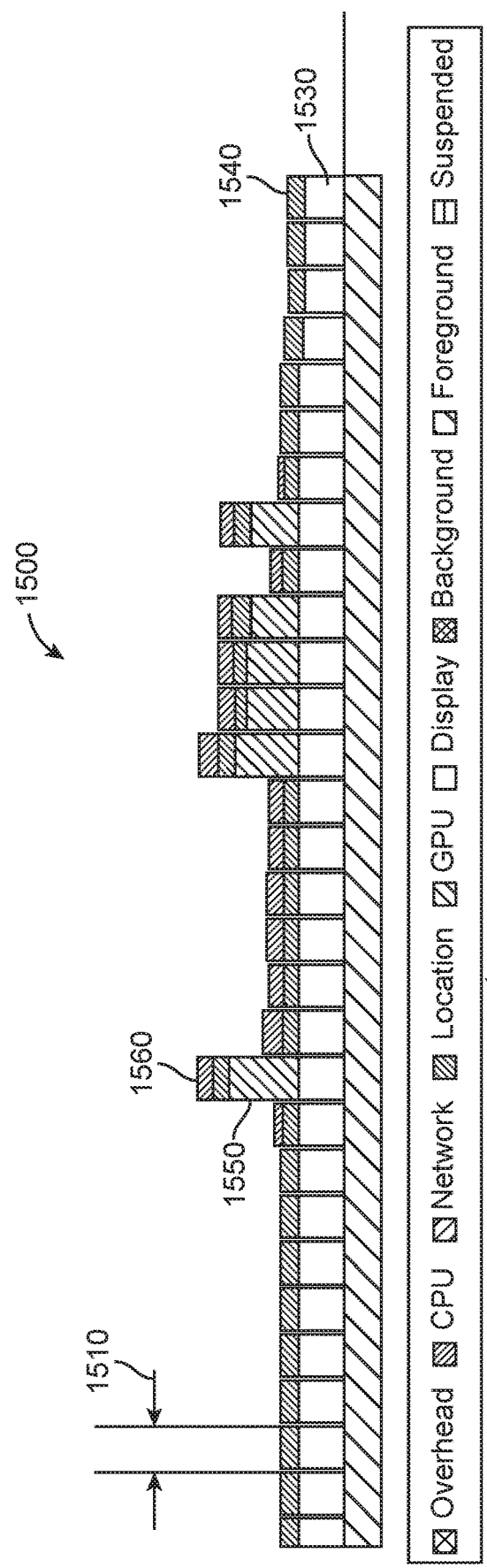
FIG. 15 illustrates a graphic image that may be provided in a development system according to an embodiment of the present invention.

FIG. 15 illustrates a graphic image that may be provided in a development system according to an embodiment of the present invention. This graphic image may be used to convey battery usage information on a first or target over time to a developer. The graphic image may include a timeline 1500 and a key 1520. The timeline may show the power dissipation by various components during individual time periods 1510. In various embodiments of the present invention, the time period may be one second or it may be a different duration. The key 1520 may identify the components of the first or target that are contributing power during each of the individual time periods 1510. In this example, screen power 1530 may be provided for each individual time. 1510. Location information circuitry power dissipation may be shown as 1540, graphics processing circuitry may consume power 1550, while a central processing unit may consume power 1560.

By viewing this information, a developer may identify ways in which the power consumed by the first or target device while running an application may be reduced. Another example is shown in the following figure.

Figure 16:
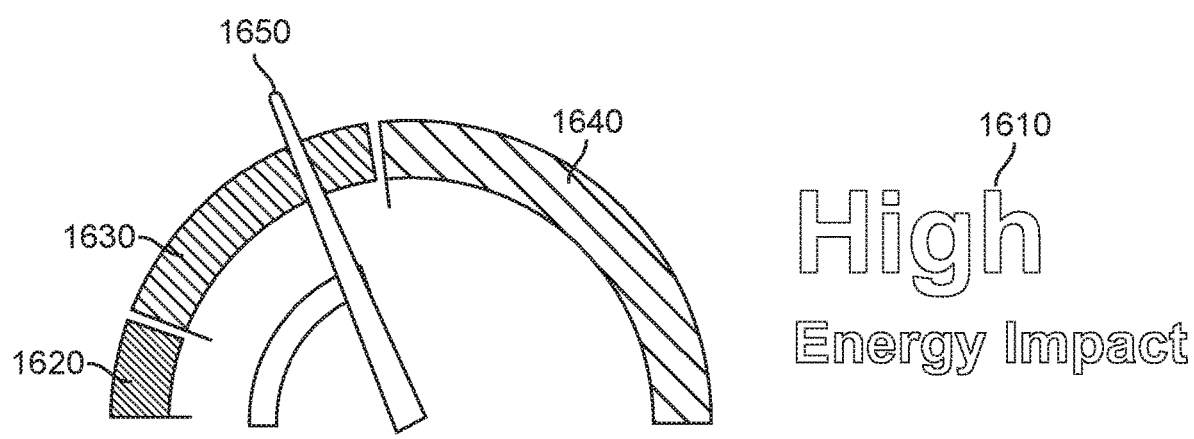
FIG. 16 illustrates another graphic image that may be provided in a development system according to an embodiment of the present invention.

FIG. 16 illustrates another graphic image that may be provided in a development system according to an embodiment of the present invention. This graphic image may be used to convey present battery usage information on a first or target to a developer. The graphic image may include a relative evaluation 1610, shown here as a high-energy impact. The graphic image may also include a speedometer-style graphic using an arrow 1650 to indicate whether an energy impact is low 1620, high 1630, or very high 1640.

Figure 17:
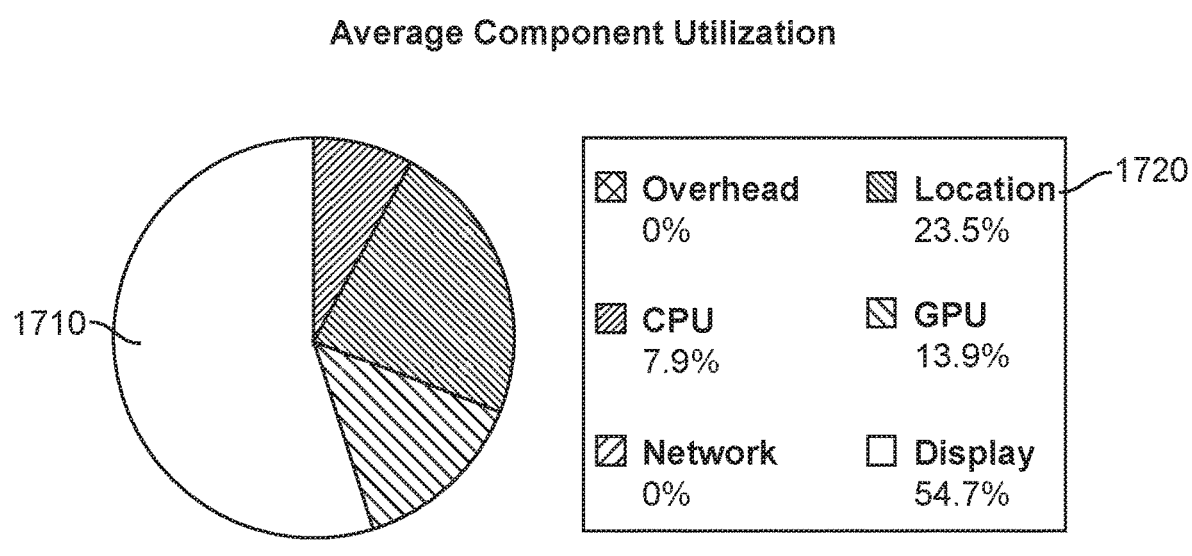
FIG. 17 illustrates another graphic image that may be provided in a development system according to an embodiment of the present invention.

FIG. 17 illustrates another graphic image the may be provided in a development system according to an embodiment of the present invention. This graphic image may include a pie chart 1710 and a key 1720. The pie chart 1710 may indicate proportional usage of the present power dissipation for each of a plurality of components of a first or target device. The key may identify components whose proportion of the total power dissipation is shown in pie chart 1710. In these and other embodiments of the present invention, any one or more than one of these and other graphic images may be provided to a developer on screen 1210 of second electronic device 1200.

In these and other embodiments of the present invention, the color values that are counted and averaged may be gamma corrected color values that are provided to a screen. In these and other embodiments of the present invention, the color values may be the color values before gamma correction occurs. Gamma correction, or de-gamma correction, may take place as needed as part of the above computations.

In these and other embodiments of the present invention, some or all of the code for transferring data to a target device, retrieving information from the target device, displaying graphics images, and the other acts described may be performed using software, such as Xcode, which is development software from Apple Inc. of Cupertino, Calif.

In these and other embodiments of the present invention, an estimation of a lowest possible power usage by screen 110 may be provided to a developer. This estimation may be generated by inverting the colors displayed. For example, text may appear as black letters on a white background. The inverse would be white letters on a black background. The power for this may be estimated by inverting each of the color values and then following the same procedure as above. This information may then be provided to the developer as a type of goal or target for power reduction. This information may be provided using graphic images, such as those shown in FIG. 15-17, or by using other graphics images.

In these and other embodiments of the present invention, the amount of information used to compute power estimations may be reduced in various ways. For example, instead of storing accumulated color value averages and frame counts for each frame, a group of frames may be consolidated into a single value. For example, each "frame" may instead correspond to a number of subframes, for example four subframes. If the image does not change during the four subframes, then a single set of accumulated color value averages and a frame count may be provided in place of four sets of accumulated color value averages and frame counts. If the image does change, then individual sets of values may be provided for each subframe. This consolidation of data may reduce the amount of data read from power computation and registers 228, thereby reducing system traffic and power dissipation.

In these and other embodiments of the present invention, the frame rate may change during the use of a device. For example, different applications may provide images to screen 110, where each application uses a different frame rate. For this reason, a frame rate that indicates an amount of time that color values are provided to a screen may be stored along with the averages of those color values. In these situations, the frame rate information may be used in place of the frame count.

In these and other embodiments of the present invention, the luminance of a screen may be reduced in order to save power. The luminance may be estimated by using the same averages, but then using a set of luminance coefficients in place of the power coefficients used above. Once the luminance has been determined, it may be adjusted based on factors such as ambient lighting and user preferences to save power.

Embodiments of the present invention may provide circuits, methods, and apparatus to estimate power usage of screens in various types of devices, such as portable computing devices, tablet computers, desktop computers, laptops, all-in-one computers, wearable computing devices, cell phones, smart phones, media phones, storage devices, portable media players, navigation systems, monitors, power supplies, video delivery systems, adapters, remote control devices, chargers, and other devices.

These and other embodiments of the present invention may provide a chipset. The chipset may include a graphics pipeline to generate color values for a plurality of subpixels of a screen, where each color value has one of N possible levels, a plurality of registers coupled to the graphics pipeline, the plurality of registers comprising one or more registers for storing data indicating a luminance the plurality of subpixels of a screen, and interface circuitry for reading data from the plurality of registers. The chipset may further include a register for storing a duration value, the duration value indicating a duration for which the color values are displayed on the screen. The chipset may further include computation circuitry coupled to the graphics pipeline to receive the color values and to count the occurrence of each of the possible N levels of the color values. This computation circuitry also multiplies the number of each occurrence by a bin value; sums the resulting products; and divides the sum by a total number of occurrences. This computation circuitry also further computes an inverted color value for each color value for a plurality of subpixels of the screen.

These and other embodiments of the present invention may provide a method of estimating power consumption of a screen. The method may include executing a software program on one or more processors wherein the software program produces data representing visual output, applying, by a graphics processing unit, a visual effect onto the visual output to produce a modified visual output, displaying, on the screen, a frame of the modified visual output, wherein the screen comprises pixels each having subpixels; generating plurality of computed values, each computed value based on color values for a color component, the color values for each color component corresponding to output provided to the subpixels of the screen for the frame, and estimating a power consumption of the screen using the generated plurality of computed value. The method may further include modifying the computed values for each of the red, green, and blue color components with the corresponding duration value, at a first event, accumulating the modified computed values for each of the red, green, and blue color components, and at a second event, and stopping accumulating the modified computed values for each of the red, green, and blue color components. The second event may occur a set duration after the first event. The second event may occur one second after the first event. The first event may be a context change to a first context and the second event may be a context change from the first context to a second context. In these and other embodiments, the first event occurs when a first application initially provides data for the color values for each color component to be provided to the subpixels of a screen and the second event occurs when the first application stops providing data for the color values for each color component to be provided to the subpixels of a screen. The accumulated modified computed values may be used to determine how the first application changes a temperature of an electronic device housing the screen. The method may further include displaying information based on the accumulated modified computed values on the screen, displaying information based on the accumulated modified computed values on a second screen. The first screen may be located on a first or target electronic device and second screen may be located on a second electronic device, separate from the first or target electronic device.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A non-transitory computer readable storage medium having stored therein first executable instructions that, when executed by one or more processors of an electronic device, cause the electronic device to estimate power consumption of a software program, the first executable instructions comprising instructions for:
    with the electronic device, receiving user input representing program code;
    with the electronic device, transferring second executable instructions from the electronic device to a target device, wherein the second executable instructions correspond to the program code, wherein the second executable instructions comprise instructions to display information on a screen of a target device;
    with the electronic device, receiving, from the target device, data corresponding to information displayed on the screen of the target device in response to the second executable instructions, wherein the received data comprises:
        for each color component, an accumulated computed value computed using color values provided by the target device to subpixels of the screen of the target device for a number of frames; and
        a duration value, wherein the duration value is a frame count indicating a number of frames for which the accumulated computed values are displayed, wherein the number of frames is capable of being greater than one;
    with the electronic device, estimating a power consumption of the screen of the target device using the received accumulated computed values and the duration value, wherein estimating the power consumption of the screen of the target device comprises multiplying the accumulated computed value for each color component by a corresponding efficiency coefficient for each color component and adding the resulting products; and
    with the electronic device, displaying the estimated power consumption on a screen of the electronic device.

2. The non-transitory computer readable storage medium of claim 1 wherein instructions for displaying the estimated power consumption comprise instructions for:
    displaying a timeline showing power usage by the screen on the target device for successive periods of time.

3. The non-transitory computer readable storage medium of claim 1 wherein instructions for displaying the estimated power consumption comprise instructions for:
    displaying a timeline showing power usage by a plurality of components on the target device for successive periods of time, the plurality of components including the screen of the target device.

4. The non-transitory computer readable storage medium of claim 1 wherein instructions for displaying the estimated power consumption comprise instructions for:
    displaying an arrow on an arc indicating a level of power usage by a plurality of components on the target device, the plurality of components including the screen of the target device.

5. The non-transitory computer readable storage medium of claim 1 wherein instructions for displaying the estimated power consumption comprise instructions for:
    displaying a pie chart indicating a portion of a total amount of power consumed on the target device by each of a plurality of components of the target device, the plurality of components including the screen of the target device.

6. The non-transitory computer readable storage medium of claim 1 wherein the screen of the target device is an organic light-emitting diode display screen.

7. The non-transitory computer readable storage medium of claim 1 wherein the received accumulated computed values are based on:
    an accumulated average value of a red color component to be provided to red subpixels of the screen of the target device for a first number of frames;
    an accumulated average value of a green color component to be provided to green subpixels of the screen of the target device for the first number of frames; and
    an accumulated average value of a blue color component to be provided to blue subpixels of the screen of the target device for the first number of frames.

8. A method of developing an application to run on a target device, the method comprising:

with an electronic device, receiving user input representing program code;
with the electronic device, transferring executable instructions from an electronic device to the target device, wherein the executable instructions correspond to the program code, wherein the executable instructions comprises instructions to display information on a screen of the target device;
with the electronic device, receiving, from the target device, data corresponding to information displayed on the screen of the target device in response to the executable instructions, wherein the received data comprises:
for each color component, an accumulated computed value computed using color values provided by the target device to subpixels of the screen of the target device for a number of frames; and
a duration value, wherein the duration value is a frame count indicating a number of frames for which the accumulated computed values are displayed, wherein the number of frames is capable of being greater than one;
with the electronic device, estimating a power consumption of the screen of the target device using the received accumulated computed values, wherein estimating the power consumption of the screen of the target device comprises multiplying the accumulated computed value for each color component by a corresponding efficiency coefficient for each color component and adding the resulting products; and
with the electronic device, displaying the estimated power consumption as a graphic image on a screen of the electronic device.

9. The method of claim 8 wherein estimating the power consumption of the screen of the target device further comprises:
for each frame provided to the screen of the target device, with the target device, generating a plurality of computed values, each computed value based on color values for a color component, the color value for each color component provided to the subpixels of the screen of the target device for the frame; and
incrementing a duration value.

10. The method of claim 9 wherein estimating the power consumption of the screen of the target device further comprises:
accumulating the plurality of computed values for a plurality of frames; and
storing the plurality of accumulated computed values and the duration value in a register of the target device.

11. The method of claim 10 wherein the graphic image is generated based on the plurality of accumulated computed values and the frame count for the plurality of frames.

12. The method of claim 8 wherein the graphic image illustrates a timeline showing power usage by the screen on the target device for each of a number of successive periods of time.

13. The method of claim 8 wherein the graphic image illustrates a timeline showing power usage by a plurality of components on the target device for each of a number of successive periods of time.

14. The method of claim 8 wherein the graphic image illustrates a arrow on an arc indicating a level of power usage by a plurality of components on the target device, the plurality of components including the screen of the target device.

15. The method of claim 8 wherein the graphic image includes a pie chart indicating a portion of a total amount of power consumed by each of a plurality of components of the target device, the plurality of components including the screen of the target device.

16. The method of claim 8 wherein the target device is a phone and the electronic device is a computer.

17. The method of claim 8 wherein the target device is a smartphone.

18. The method of claim 17 wherein the electronic device is a laptop computer.

* * * * *